United States Patent Office 3,090,218
Patented May 21, 1963

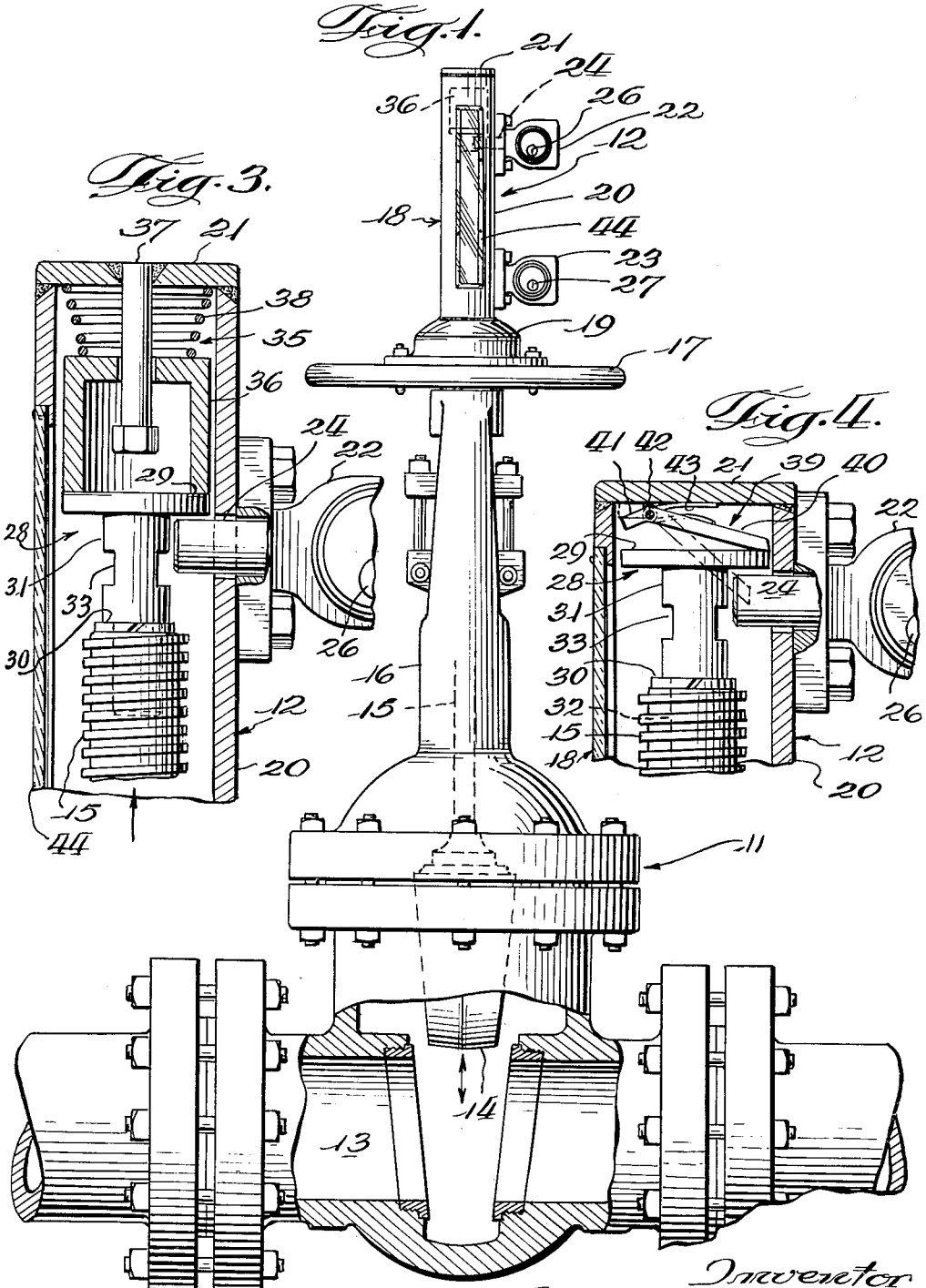

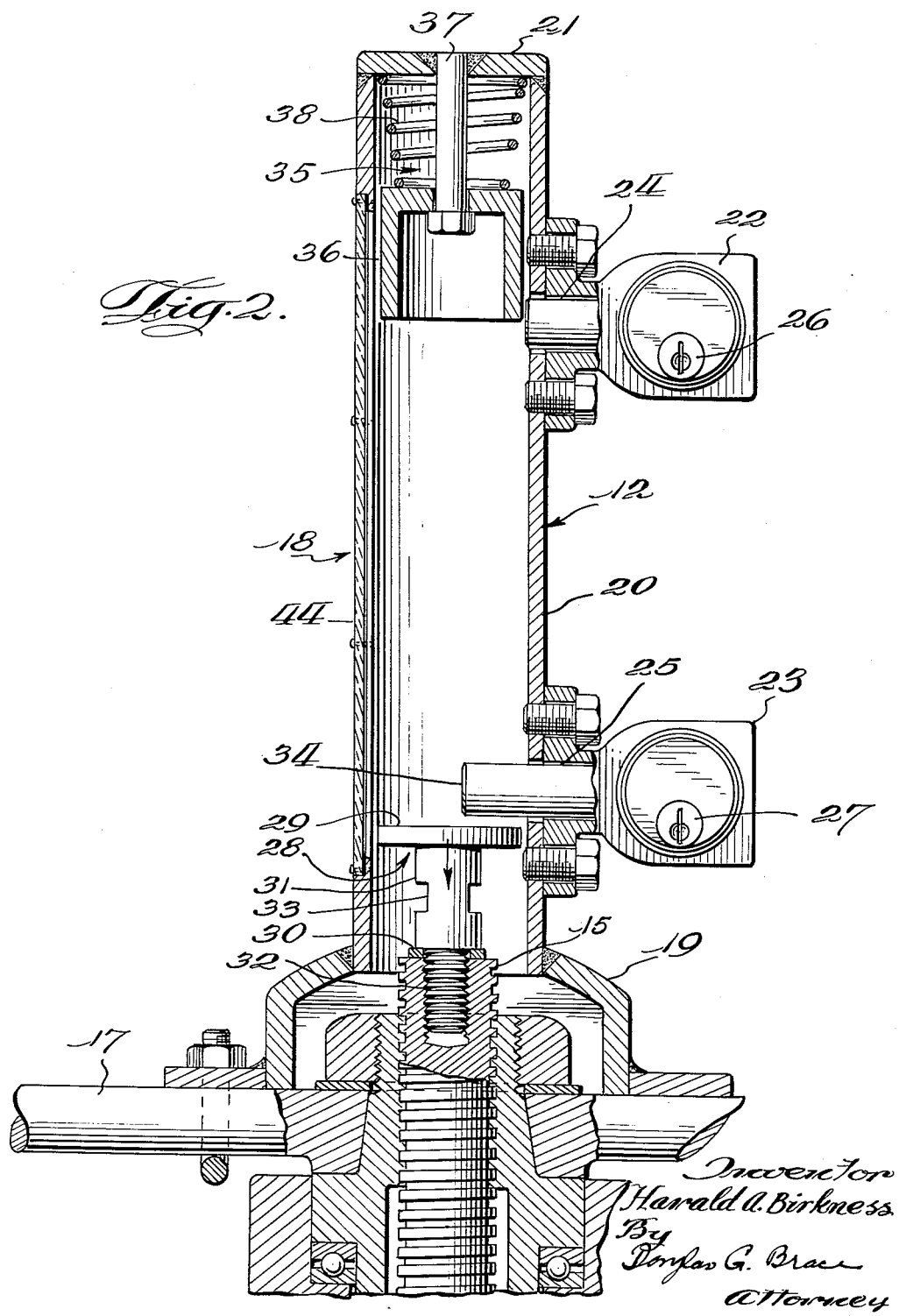

3,090,218
LOCKED-SAFE VALVE
Harald A. Birkness, Homewood, Ill., assignor to Standard Oil Company, Chicago, Ill., a corporation of Indiana
Filed Nov. 27, 1959, Ser. No. 855,863
14 Claims. (Cl. 70—179)

This invention relates to a locked-safe valve and to a mechanism for holding in a static position a reciprocable member.

Safe operation of various processing units involving the handling of fluids frequently requires that valves remain open or closed. On other occasions it is necessary that a series of valves are opened and/or closed in a particular sequence. However, at times due to operator failure, a valve may be opened when it should have stayed closed or closed when it should have stayed opened, thereby upsetting the processing unit or, worse yet, causing a disaster.

Presently available means for locking a valve either closed or open are difficult to install and more difficult to maintain. Such mechanisms have several moving parts which are subject to failure due to corrosion, misalignment or wear. The simple devices involving the mating of holes in two members to accept a pin are particularly subject to misalignment.

In addition to valves, other mechanisms having a reciprocating member often need to be locked in a static position.

It is an object of this invention to provide a locked-safe rising stem valve. It is an additional object of this invention to provide a locked-safe rising stem valve which cannot be inadvertently moved from its locked position. It is a further object of this invention to provide a simple means for locking into a static position a reciprocable member. It is another object of this invention to provide a simple means for locking into a static position a reciprocable member in any plane. It is still another object of the invention to provide a mechanism for locking a reciprocable member in either of two fixed positions. It is yet another object of the invention to provide a mechanism which by failure to position itself advises of the relative position of a reciprocable member. It is a particular object of the invention to provide a rising stem valve having an interlock mechanism by which it is readily determinable when the valve is fully opened or fully closed and locked safe in either position. Other objects of the invention will become apparent in the course of the detailed description thereof.

The locked-safe valve of the invention comprises a valve provided with a rising stem and means operated by the stem for controlling the flow through the valve. There is provided an interlock mechanism adapted for locking the stem in a static position, usually when the valve is fully closed or fully opened or both. The interlock mechanism comprises an elongated element disposed parallel to the longitudinal axis of the stem and affixed to the valve. Locking means for restraining the movement of the stem are positioned on the elongated element. The locking means engages an engaging means which engaging means is responsive to movement of the stem, whereby the stem is locked in a static position.

It is apparent that the interlock mechanism described above is adaptable to lock in a static position any reciprocable member.

A particular embodiment of the interlock mechanism of the invention and a locked-safe valve utilizing this particular interlock mechanism are set out in the annexed figures which figures form a part of this specification.

FIGURE 1 shows an elevation view of a rising stem gate valve with an interlock mechanism.

FIGURE 2 shows a cutaway plan view of the upper portion of the rising stem valve of FIGURE 1 and the interlock mechanism in detail with the stem of the valve in the closed position.

FIGURE 3 shows a partial detailed elevation view of the upper portion of the interlock mechanism when the stem of the valve is in the fully opened position.

FIGURE 4 shows a detailed elevation view of the upper portion of an alternative embodiment of the blocking means present in the interlock mechanism.

The invention is described in detail in connection with the embodiment shown in the figures.

Referring now to FIGURE 1, a rising stem gate valve 11 is provided with an interlock mechanism 12. The valve 11 is provided with a passageway 13 which passageway may be closed off by means of gate 14. In FIGURE 1, valve 11 is shown with gate 14 in the fully opened position. Gate 14 is moved vertically by means of a threaded rising stem 15, which in FIPURE 1 is shown raised through valve bonnet 16 to the farthermost position in interlock mechanism 12. Turning of the wheel 17 raises or lowers valve stem 15. Interlock mechanism 12 is affixed to valve 11 by bolting to wheel 17.

FIGURE 2 is a detailed cutaway view of the valve interlock mechanism 12. In the embodiment shown, the elongated element 18 is made up of two tubular bodies, a cap-like base portion 19 and an elongated tube 20 provided with a closure 21. The elongated element 18 is parallel to the longitudinal axis of the stem 15, and the sides of elongated tube 20 are adjacent to the longitudinal axis of stem 15.

Locking means 22 and 23 are positioned on elongated tube 20. The locking means 22 and 23 are adapted for restraining the movement of stem 15. Locking means 23 is mounted on the elongated tube 20 at a point adapted for restraining the upward movement of stem 15 when the gate 14 is in an essentially fully closed position.

Locking means 22 is positioned on elongated tube 20 substantially adapted for restraining the downward movement of stem 15 when gate 14 is in a substantially fully opened position. Locking means 22 and 23 herein are provided with bolt-like members 24 and 25, respectively. Bolt-like members 24 and 25 are adapted for movement into the line of movement of hereinafter described engaging means.

Locking means 22 and 23 herein are further provided with means for transverse movement of bolt-like elements 24 and 25, respectively. Such means are key operated through keys 26 and 27, respectively.

Locking means 22 and 23 are adapted for engagement with engaging means 28 to restrain the movement of stem 15 from either an essentially fully closed position or a substantially fully opened position of gate 14. The engaging means 28 herein comprises a plate 29 which is in spaced relationship with the end 30 of stem 15. Plate 29 is joined to stem 15 by means of a shaft 31 provided with a threaded end 32 and a recess 33 affording purchase for a wrench. When gate 14 is in an essentially fully closed position, as shown in FIGURE 2, the bolt-like member 25 of locking means 23 protrudes into the line of movement of and overlaps plate 29, thereby restraining the upward movement of stem 15. In a preferred embodiment as shown in FIGURE 2, the extent of movement of bolt-like element 25 is sufficient so that the end 34 of bolt-like element 25 overlaps the projection of the end 30 of stem 15.

Locking means 22 and 23 are preferably constructed so that keys 26 and 27, respectively, may not be inserted or withdrawn from their respective keyholes except when bolt-like elements 24 and 25, respectively, are either fully extended or fully retracted.

In order that bolt-like element 24 is not inadvertently extended into the line of movement of plate 29, the embodiment of FIGURE 2 blocking means 35 is provided. Herein blocking means 35 comprises a hanger 36 movably suspended on rod 37 which rod 37 is affixed to cap 21. The sides of hanger 36 normally block the path of movement of bolt-like element 24. However, hanger 36 is disposed so that when it is contacted with plate 29 as stem 15 rises, the hanger 36 will be displaced so that it no longer blocks the movement of bolt-like element 24 and thereby permits bolt-like element 24 to be extended into the line of movement of plate 29, as is shown in FIGURE 3.

FIGURE 3 shows the relationship between engaging means 28 and bolt-like element 24, herein shown fully extended, when gate 14 is in a substantially fully opened position.

If the interlock mechanism 12 is in any except a substantially vertical position, it is necessary to have a means for maintaining hanger 36 in its normal position blocking the movement of bolt-like element 24. In the embodiments shown in FIGURES 2 and 3, coil spring 38 is provided for this purpose.

An alternative embodiment of blocking means is shown in FIGURE 4, which shows stem 15 at the top of interlock mechanism 12. Herein the blocking means comprises a bent lever 39 having a long arm 40 and a shorter arm 41. Lever 39 is pivotably mounted to cap 21 by means of a pivot 42. Long arm 40 is of such length that normally, except when stem 15 is raised so that gate 14 is substantially fully open, said long arm 40 blocks the movement of bolt-like element 24 into the line of movement of plate 29. The short arm 41 prevents the long arm 40 from rotating past the point where it effectively blocks bolt-like element 24. Spring 43, affixed to cap 21, maintains long arm 40 in its blocking position except when stem 15 is raised.

The distance between plate 29 and bolt-like elements 24 and 25, when gate 14 is in a substantailly fully opened or essentially fully closed position, respectively, is not critical, and may be about 1/16 to 1/4 inch. Closer spacing is permissible but increases the possibility of misalignment on account of valve wear.

The interlock mechanism 12 and its elements may be constructed of any of the usual materials of construction such as plain steel, stainless steel, brass, copper, aluminum, etc., depending upon the corrosiveness of the atmosphere in which the interlock mechanism is to be used, the size of the mechanism and the valve, and other factors substantially independent of structural strength. However, plate 29 should be sturdily constructed because of the considerable shearing force which could be exerted against it by bolt-like elements 24 and 25 as a result of the force multiplication inherent in the combination of wheel 17 and screwed stem 15.

To provide visual inspection of the positioning of bolt-like elements 24 and 25 with respect to plate 29, elongated tube 20 of the interlock mechanism 12 may be provided with an aperture 44 having a cover of glass or transparent plastic. In FIGURE 1, aperture 44 is shown in a plane parallel to the movement of bolt-like elements 24 and 25 and, for the sake of increased clarity, is shown in FIGURES 2 and 3 in a plane perpendicular to the movement of bolt-like elements 24 and 25.

In order to assure that bolt-like element 25 is not fully extended inadvertently when gate 14 is in any except an essentially fully closed position, the end 34 of bolt-like element 25 should when the latter is fully extended extend into the path of movement of shaft 31 and end 30 of stem 15. If bolt-like element 25 is so designed, then the fact that gate 14 is not essentially fully closed will become immediately apparent to anyone who attempts to extend bolt-like element 25.

For convenience, elongated tube 20 may be rotatably affixed to cap-like base portion 19.

The operation of the locked-safe valve of this invention will next be described starting with the gate 14 in the essentially fully closed position, bolt-like element 24 fully retracted and bolt-like element 25 fully extended, as shown in FIGURE 2. In such position, valve 11 is locked closed. To change the position of gate 14, bolt-like element 25 is fully retracted using key 27. Gate 14 is now opened by the turning of wheel 17, which causes stem 15 to rise. Such operation is continued until gate 14 is substantially fully open, at which point stem 15 will have been raised to its fullest extent, and plate 29 will have displaced hanger 36 so that it no longer blocks the movement of bolt-like element 24. Key 26 is used to fully extend bolt-like element 24 until it overlaps plate 29, whereby gate 14 is locked into a substantially fully opened position. Keys 26 and 27 are then withdrawn from locking means 22 and 23, respectively.

Locking means 22 or 23 may be so designed that keys 26 or 27 may only be withdrawn therefrom when bolt-like elements 24 or 25 are fully extended or fully retracted. By using such locking means, it is possible to have a series of two or more valves which can only be opened or closed in a particular sequence.

A sequential operation may be illustrated by considering the situation of two locked-safe valves of this invention, one of which is normally open while the other is closed, neither of which is to be closed simultaneously, and the interlock mechanisms are so designed that at any one time only a single key may be withdrawn from their locking means. Starting with the first valve in the closed position and the second valve in the opened position, key 27 of the first valve is inserted in locking means 23 thereof and bolt-like element 25 fully retracted. Locking means 23 is so designed that key 27 may be inserted or withdrawn therefrom only when bolt-like element 25 is fully extended. The first valve is now opened to a substantially fully opened position, whereupon key 26 is used to fully extend bolt-like element 24, thereby locking the first valve in such position. Locking means 22 is similar in design to locking means 23, in that key 26 may be inserted or withdrawn therefrom only when bolt-like element 24 is fully extended. Key 26 is now withdrawn from locking means 22 of the first valve and used to retract bolt-like element 24 of locking means 22 of the second valve. This permits the second valve to be changed from a substantially fully opened position to an essentially fully closed position, whereupon key 27 of the second valve is used to fully extend bolt-like element 25 of locking means 23 thereof, thereby locking the second valve into an essentially fully closed position. Key 27 of the second valve may then be withdrawn and returned to a place of storage, such as in a control house, with assurance that the valves cannot be opened or closed inadvertently or in other than the reverse of the above-described sequence.

Having described the invention, what is claimed is:

1. A locked-safe rising stem for a valve comprising a rising stem and an interlock mechanism for maintaining in a static position said rising stem which mechanism comprises a tubular body, said body being mounted on said valve and enclosing the path of travel of the end of said stem, two locking means, said locking means being mounted on said body, the first of said locking means being positioned on said body substantially opposite the end of said stem when said valve is essentially closed, the second of said locking means being positioned substantially opposite the end of said stem when said valve is substantially fully opened, a plate, said plate being in spaced relationship to the end of said stem, said plate being perpendicular to the line of movement of said stem, said plate being adapted for engagement with hereinafter described bolt-like members and in an overlapping relationship with said end, each of said locking means comprising a bolt-like element adapted for movement into the line of movement of said plate, and overlapping and engaging said plate independently of the rotational alignment with said plate, the bolt-like element of said first locking means being adapted for fully extended movement into the line of movement of said plate only when said valve is essentially closed, and a hanger, said hanger being supported by said body and being movably positioned to normally prevent movement of said bolt-like element of said second locking means into the line of movement of said plate, said hanger being adapted for displacement by said plate when said valve is substantially fully opened.

2. The locked-safe valve of claim 1 wherein said interlock mechanism comprises a spring, said spring being positioned to normally maintain said hanger to prevent movement of said bolt-like element of said second locking means into the path of said plate, and said spring permitting displacement of said hanger by said plate when said valve is substantially fully opened.

3. An interlock mechanism for maintaining in a static position a reciprocable member which mechanism comprises an elongated element adapted for mounting adjacent to and parallel to the line of movement of said member, locking means for restraining the movement of said member, said locking means being positioned on said element, and engaging means responsive to movement of said member adapted for engagement with said locking means independently of the rotational alignment between said member and said locking means, whereby engagement of said locking means and said engaging means maintains said member in a static position.

4. The interlock mechanism of claim 3 which mechanism comprises two locking means, one of said locking means being positioned at substantially the farthermost point of movement of said reciprocable member and the other locking means being positioned at substantially the nearermost point of movement of said member.

5. An interlock mechanism for maintaining in a static position a reciprocable member which mechanism comprises an elongated element adapted for mounting adjacent to and parallel to the line of movement of said member, two locking means, one of said locking means being positioned at substantially the farthermost point of movement of said member, the other locking means being positioned at substantially the nearermost point of movement of said member, engaging means responsive to movement of said member adapted for engagement with each of said locking means singly and independently of the rotational alignment between said member and said locking means, whereby engagement of said locking means and said engaging means maintains said member at the one or the other extreme point of movement of said member, and blocking means disposed on said elongated element adapted for preventing the engagement of one of said locking means with said engaging means, said blocking means being adapted for displacement by the movement of said member to an extreme point of movement, whereby said locking means may be engaged with said engaging means.

6. The mechanism of claim 5 wherein said elongated element is a tubular body, said body being positioned to enclose the path of travel of the end of said reciprocable member.

7. The mechanism of claim 5 wherein said engaging means comprises a plate, said plate being in spaced relationship to that end of said member which travels between said locking means, said plate being perpendicular to the line of movement of said member, said plate being adapted for engagement with said locking means and in an overlapping relationship with said end.

8. The mechanism of claim 5 wherein each of said locking means comprises a bolt-like element adapted for movement into the line of movement of said reciprocable member, and engaging said engaging means.

9. The mechanism of claim 8 wherein said blocking means comprises a member adapted for blocking the movement of said bolt-like element into the line of movement of said reciprocable member.

10. The mechanism of claim 9 wherein said blocking means is a hanger movably positioned to normally prevent movement of said bolt-like element into the line of movement of said reciprocable member.

11. The mechanism of claim 9 wherein said blocking means comprises a lever, said lever comprising two arms joined to form an obtuse angle, and said lever being pivotally mounted on said elongated element at the apex of said angle.

12. The mechanism of claim 10 which comprises a spring, said spring being positioned to maintain said hanger in a position to normally prevent movement of said bolt-like element into the line of movement of said reciprocable member.

13. An interlock mechanism for maintaining in a static position the stem of a rising stem valve which mechanism comprises a tubular body, said body being mounted on said valve and enclosing the path of travel of the end of said stem, two locking means, said locking means being mounted on said body, the first of said locking means being positioned on said body substantially opposite the end of said stem when said valve is essentially closed, the second of said locking means being positioned substantially opposite the end of said stem when said valve is substantially fully opened, a plate, said plate being in spaced relationship to the end of said stem, said plate being perpendicular to the line of movement of said stem, said plate being adapted for engagement with hereinafter described bolt-like members independently of the rotational alignment between said stem and said bolt-like members and in an overlapping relationship with said end, each of said locking means comprising a bolt-like element adapted for movement into the line of movement of said plate, and overlapping and engaging said plate, the bolt-like element of said first locking means being adapted for fully extended movement into the line of movement of said plate only when said valve is essentially closed, and a hanger, said hanger being supported by said body and being movably positioned to normally prevent movement of said bolt-like element of said second locking means into the line of movement of said plate, said hanger being adapted for displacement by said plate when said valve is substantially fully opened.

14. The mechanism of claim 13 which comprises a spring, said spring being positioned to normally maintain said hanger to prevent movement of said bolt-like element of said second locking means into the path of said rising stem, and said spring permitting displacement of said hanger by said stem when said valve is substantially fully opened.

References Cited in the file of this patent
UNITED STATES PATENTS

| | | |
|---|---|---|
| 1,367,855 | Bolles | Feb. 8, 1921 |
| 1,768,021 | Bauerband | June 24, 1930 |
| 2,439,113 | Thieme | Apr. 6, 1948 |